Nov. 20, 1956  E. G. RIX  2,770,990
HOLD-DOWN VISE
Filed July 13, 1955  2 Sheets-Sheet 1
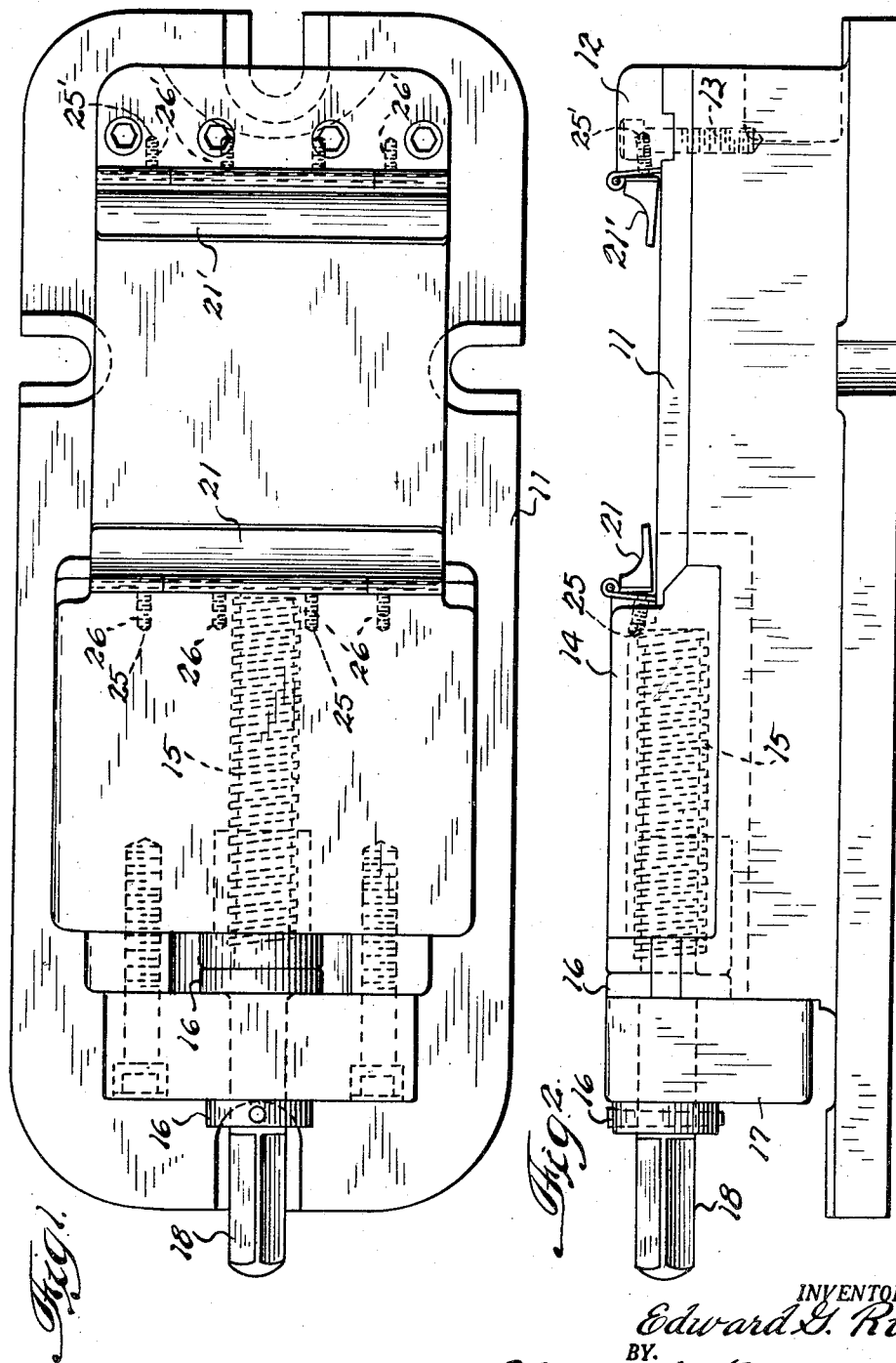
INVENTOR.
Edward G. Rix.
BY
Thiess, Olsen, Mecklenburger,
van Holst, & Coltman.

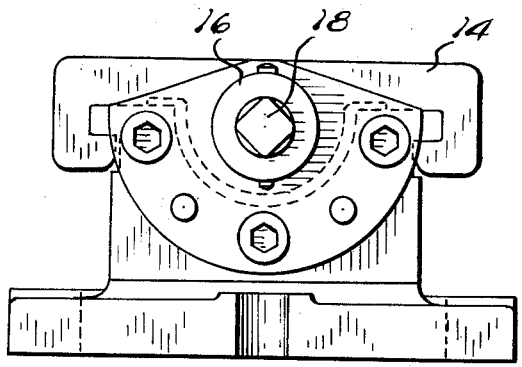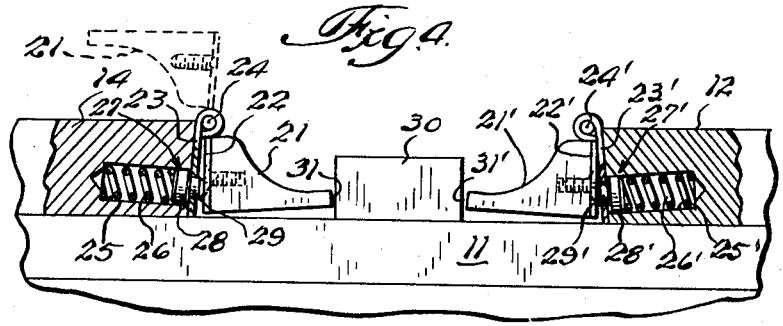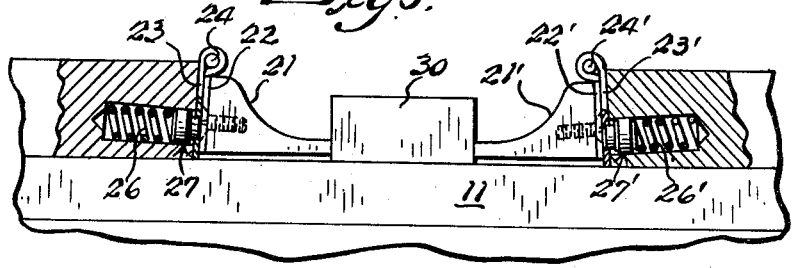

United States Patent Office 2,770,990
Patented Nov. 20, 1956

2,770,990

HOLD-DOWN VISE

Edward G. Rix, Wilmette, Ill., assignor to Stanley L. Shelter and Edward G. Rix, a copartnership doing business as Illinois Metal Products Application July 13, 1955, Serial No. 521,733

7 Claims. (Cl. 81—38)

This invention relates to a vise for holding work on a work-supporting table of a machine tool, frequently referred to in the art as a "hold-down" vise. It is an object of the invention to provide improved apparatus of that character.

A hold-down vise conventionally employs a pair of clamping members movable inwardly toward each other and outwardly away from each other under the influence of a large machine screw. For practical reasons, the screw or screws which operate the clamping members are arranged below the surface of the work table whereby the forces applied by the screws to the members are directed along lines extending below the table top. The counteracting force exerted by the work against the clamping members as the work is compressed therebetween is, of course, directed along lines lying above the surface of the table. If the members directly contact the work, the counteracting forces applied to the members result in a torque which lifts the work-engaging ends of these members and hence raises the work off the table. One practice in common use is that of hammering the work back down against the surface of the table after the clamping members have been tightened. This crude method is, of course, unsatisfactory for obvious reasons.

Prior art solutions to this problem are numerous and are uniformly unsatisfactory for diverse reasons.

In accordance with one embodiment of the present invention, jaws are pivotally mounted on the facing ends of the clamping members. Spring means urge these jaws to pivot inwardly toward each other with respect to the clamping members. When the clamping members are brought together such that the jaws bear against the work, the resultant pressure forces the jaws to pivot away from each other against the action of the spring means. The resultant pivotal movement of the jaws swings the work-engaging faces thereof downwardly a sufficient distance to compensate for the raising of the clamping members. The spring means operating between the jaws and the clamping members are limited in their movement with respect to the clamping members between corresponding positions of the jaws which may be termed the full work-engaging position and the initial work-engaging position. Accordingly, the jaws may be pivoted inwardly and upwardly free of the spring means through a sufficient angle to permit thorough cleaning away of any chips or other debris. This latter factor overcomes a distinct disadvantage appearing in the closest known prior art devices.

Accordingly, it is another object of the invention to provide an improved hold-down vise which holds work securely down against a work table in spite of play between the clamping members of the vise and the work table.

It is another object of the invention to provide an improved hold-down vise having spring-backed jaws pivotally mounted on clamping members and capable of holding work securely down against a work table in spite of play between the clamping members and work table.

It is another object of the invention to provide an improved hold-down vise having spring-backed jaws pivotally mounted on clamping members, the jaws being freely movable upwardly away from an associated work table to permit convenient cleaning away of chips and other debris.

It is another object of the invention to provide an improved hold-down vise having the characteristics defined above and in which spring means operating against the jaws are limited to movement between positions corresponding to the initial work-engaging position of the jaws and the full work-engaging position thereof.

It is another object of the invention to provide an improved hold-down vise having one or more of the characteristics described above while being efficient, dependable and economical to manufacture.

This invention, together with further objects and advantages thereof, will best be understood by reference to the following description taken in connection with the accompanying drawings and its scope will be pointed out in the appended claims.

In the drawings, in which like parts are designated by like reference numerals,

Figure 1 is a plan view of apparatus illustrating one embodiment of the invention;

Fig. 2 is an elevation of the apparatus of Fig. 1;

Fig. 3 is a left-hand end view of the apparatus of Figs 1 and 2;

Fig. 4 is an enlarged fragmentary elevation, parts being broken away and shown in section, of the same apparatus and shows the work-engaging parts in their initial work-engaging position, and Fig. 5 is a view similar to Fig. 4 but showing the parts in their full work-engaging position.

A work table 11 is shown in the drawings, this normally being a part of or associated with a power-operated machine tool. The purpose of the present invention is to hold a work piece securely to the table 11 so that when the machine tool proper and the work table 11 move with respect to each other, work may be performed on the work piece by the machine tool proper.

In the particular embodiment of the invention illustrated, one clamping member 12 is rigidly secured to the work table as by screws 13. The other clamping member 14 is slidable along the table 11 and loosely interlocks with the table, as by a suitable dovetail construction suggested in Fig. 3 and well understood in the art. The member 14 is driven forcibly along the table top by a large screw 15. The screw 15 may threadably engage the clamping member 14 and be restrained from longitudinal movement by a pair of collars or shoulders 16 which engage a fixed bearing member 17. The screw may be rotated by turning the exposed end 18 of the screw.

The clamping member 14 may, of course, be driven back and forth toward and away from the fixed clamping member 12 by various means, the driving apparatus shown in the drawings being merely illustrative. Furthermore, the clamping member 12 may, if desired, be slidable along the work table such that both clamping members move toward and away from each other to grip and release work.

If the clamping members 12 and 14 were to have jaws or jaw faces rigidly connected thereto for engagement with the work, it is well recognized that the clamping member 14 will rise with respect to the work table 11 when the work is compressed between the clamping members, with the result that the work is raised off the table 11. This results from the fact that a certain amount of play between the movable clamping member and the work table is unavoidable, and the forcing acting on the movable clamping member, namely, the driving force of the screw 15 and the counteracting force of the work against the clamping member, produce a torque. A rigid jaw face on the clamping member 14 would engage the work while the clamping member is in its lowermost position, and subsequent tightening of the vise would produce the torque referred to above and cause the movable clamping member to rise by whatever degree of play exists between the clamping member and the work table. The principal purpose of the invention is to counteract this lifting tendency whereby the work pieces will be securely held against the work table after tightening of the vise.

Referring to Figs. 4 and 5, it will be seen that a separate jaw 21 is pivotally secured to the movable clamping member 14 by a hinge construction comprising a hinge leaf 22 secured to the jaw 21, a hinge leaf 23 secured to the clamping member 14, and a pintle pin 24. This hinge is preferably of such construction that the jaw 21 can swing from the position illustrated in Fig. 4 through an angle of 90 or even 180 degrees in a counter-clockwise direction to the position indicated in phantom lines in Fig. 4, such that work chips and other debris may readily be wiped off the work table, particularly that portion of the work table which lies under the jaw 21 and adjacent the clamping member 14. If the jaw 21 is permitted to pivot through an angle of approximately 180 degrees, it will be seen that it will remain in this withdrawn position under its own weight, thereby further facilitating the cleaning of the work table.

A similar jaw and hinge is shown associated with the fixed clamping member 12, the various parts being designated by like reference numerals with a prime mark. This is essential to full utility of the invention if both clamping members are movable. If one clamping member is fixed as is the clamping member 12 of the illustrated embodiment of the invention, the movable jaw 21' may be omitted in favor of a jaw or jaw face which is fixed with respect to the clamping member, but even with a fixed clamping member, the movable jaw and associated hinge is preferred since it assures that the work piece will be held firmly against the work table.

Behind the jaw 21 and within each of a plurality of cavities 25 in the clamping member 14 is a spring 26 which is under compression between the rear wall of the cavity and a plug 27. The plug 27 comprises a main body 28 of such dimensions that it may slide freely in the cavity 25, but is limited in its inward movement (toward the work) by engagement with the hinge leaf 23. A stud portion 29 of the plug 27 extends through an opening in the hinge leaf 23, this opening being too small to permit passage of the main body portion 28 of the plug therethrough. A plurality of similar cavities, springs and plugs, are associated with the right-hand jaw and clamping member and are designated by like reference numerals with a prime mark.

Under normal conditions, the spring 26 urges the plug 27 inwardly toward the work until the main body 28 of the plug engages the leaf 23. The stud portion 29 of the plug then extends through the hinge leaf 23 and is in position to engage the jaw 21 when the latter is in the position illustrated in Fig. 4. Since the spring 26 is of sufficient strength that it readily carries the weight of the jaw 21, the latter is normally maintained in its position of Fig. 4 by the spring 26 and the plug 27. This is the position of the jaw 21 when it first engages a work piece 30 as the screw 15 is tightened and is termed herein the "initial work-engaging position" of the jaw 21. The right-hand jaw 21' operates in the same manner and is shown in Fig. 4 in its initial work-engaging position.

As the screw 15 is tightened further, the counteracting force of the work piece 30 against the jaws 21 and 21' forces them to pivot outwardly of the work and drives the plugs 27 and 27' outwardly away from the work against the action of the springs 26 and 26'. This continues until the hinge leaves 22 and 22' are brought to bear against the corresponding hinge leaves 23 and 23'. This is the full work-engaging position of the jaws and is illustrated in Fig. 5.

During this pivotal movement of the jaws 21 and 21', their work-engaging faces 31 and 31' swing downwardly. The downward movement is readily made to be more than enough to compensate for the lifting of the movable clamping member 14 resulting from the tightening of the screw 15 and the inevitable play between the clamping member and the work table. Accordingly, the jaw faces 31 and 31' must actually slide down the side of the work piece and press the work piece firmly against the table 11. It should be noted that the springs 26 and 26' should be sufficiently stiff that pressure of the jaws against the plugs prior to engagement of the hinge leaves is of sufficient magnitude that the clamping member 14 is raised as far as the vertical play in its movement will permit before the hinge leaves contact and hence before the jaw faces 31 and 31' reach their lowermost positions.

The apparatus as so far described provides a downward movement of the work-engaging jaw face 31 after the movable clamping member 14 has been raised to the uppermost limit of its play whereby the work piece 30 is necessarily pressed firmly against the work table 11. At the same time the jaws 21 and 21' are free to pivot inwardly and upwardly, clear of the work table 11, so that chips and other debris may readily be cleaned from the work table and, more specifically, may be removed from under and behind the jaws 21. An important characteristic of this feature of the invention is that the springs 26 and 26' are limited by the associated plugs in such a manner that they cannot follow the jaws beyond their initial work-engaging positions. This applies even though the springs may be prestressed such that they provide substantial resistance to the initial movement of the jaws from their initial work-engaging positions toward their full work-engaging positions.

It will be noted that the hinge leaves 23 and 23' as secured to the clamping member 14 and 12 slope downwardly and outwardly of the work piece 30. As a result, when the jaws reach their full work-engaging positions illustrated in Fig. 5, further tightening of the main screw 15, setting up greater pressures, provides a downward component of force to the jaws. Accordingly, the upward component of force applied to the jaws by the work piece may be fully compensated by the downward force applied to the jaws by the clamping members, which latter results from the sloping faces of the hinge leaves as they abut in Fig. 5. A relatively small slope such as that indicated in Fig. 5 may fully compensate whereby little or no force is transmitted from one hinge leaf to the other through the pintle pin, all or practically all forces being transmitted directly from one hinge leaf to the other. Accordingly, a relatively light-weight hinge or other pivot means may be employed in spite of the large forces in operation.

It will now be seen that the illustrated embodiment of the invention exerts a very substantial downward force on the work piece in spite of an appreciable lifting of one or both of the clamping members. At the same time, chips and other debris may be readily be cleaned from the work table, and particularly from those areas under and behind the movable jaws. Still further, by virtue of the slope of the hinge leaves 23 and 23' as secured to the clamping members 14 and 12, relatively light-weight hinges or other pivot means may be employed.

It will be understood that the illustrated apparatus may be modified substantially and still fall within the scope of the invention. Various modifications can be made in the form of the springs. Still further, the shape or cross-section of the jaws can be materially altered, the critical factor being that the actual work-engaging face thereof is located below the pivotal axis of the corresponding jaw.

While particular embodiments of the invention have been shown, it will be understood, of course, that the invention is not limited thereto since many modifications may be made, and it is, therefore, contemplated to cover by the appended claims any such modifications as fall within the function and scope of the invention.

The invention having thus been described, what is claimed and desired to be secured by Letters Patent is:

1. A vise for holding work on a work-supporting table of a machine tool, said vise comprising a pair of members movable inwardly toward and outwardly away from each other, a pair of jaws, each having a work-engaging face, said jaws being pivotally mounted on respective ones of said members whereby each is freely pivotable inwardly and upwardly from an initial work-engaging position to a retracted position, the pivotal axes of said jaws being generally parallel to said work-supporting table and substantially above said work-engaging faces of said jaws when said jaws are in said initial work-engaging position, each of said jaws also being pivotable outwardly from said initial work-engaging position to a full work-engaging position, spring means associated with said members, said spring means being arranged to resist movement of said jaw members from said initial work-engaging position to said full work-engaging position, means for preventing movement of said spring means beyond the position corresponding to the initial work-engaging position of said jaws, and a face on each of said members engageable by said jaws to prevent outward movement of said jaws beyond said full work-engaging position.

2. A vise for holding work on a work-supporting table of a machine tool, said vise comprising a pair of members movable inwardly toward and outwardly away from each other, a pair of jaws, each having a work-engaging face, said jaws being pivotally mounted on respective ones of said members whereby each is freely pivotable inwardly and upwardly from an initial work-engaging position to a retracted position, the pivotal axes of said jaws being generally parallel to said work-supporting table and substantially above said work-engaging faces of said jaws when said jaws are in said initial work-engaging position, each of said jaws also being pivotable outwardly from said initial work-engaging position to a full work-engaging position, spring means associated with said members, said spring means being arranged to resist movement of said jaw members from said initial work-engaging position to said full work-engaging position, means for preventing movement of said spring means beyond the position corresponding to the initial work-engaging position of said jaws, and a face on each of said members engageable by said jaws to prevent outward movement of said jaws beyond said full work-engagng position, said member faces lying below and outwardly of said pivotal axes of said jaws.

3. A vise for holding work on a work-supporting table of a machine tool, said vise comprising a pair of members movable inwardly toward and outwardly away from each other, a pair of jaws, each having a work-engaging face, said jaws being pivotally mounted on respective ones of said members whereby each is freely pivotable inwardly and upwardly from an initial work-engaging position to a retracted position, the pivotal axes of said jaws being generally parallel to said work-supporting table and substantially above said work-engaging faces of said jaws when said jaws are in said initial work-engaging position, each of said jaws also being pivotable outwardly from said initial work-engaging position to a full work-engaging position, a face on each of said members engageable by said jaws to prevent movement of said jaws beyond said full work-engaging position, a recess in each of said member faces, spring means arranged within said recesses and arranged to resist movement of said jaw members from said initial work-engaging position to said full work-engaging position, and means for preventing movement of said spring means beyond the position corresponding to the initial work-engaging position of said jaws.

4. A vise for holding work on a work-supporting table of a machine tool, said vise comprising a pair of members movable inwardly toward and outwardly away from each other, a pair of jaws, each having a work-engaging face, said jaws being pivotally mounted on respective ones of said members whereby each is freely pivotable inwardly and upwardly from an initial work-engaging position to a retracted position, the pivotal axes of said jaws being generally parallel to said work-supporting table and substantially above said work-engaging faces of said jaws when said jaws are in said initial work-engaging position, each of said jaws also being pivotable outwardly from said initial work-engaging position to a full work-engaging position, a face on each of said members engageable by said jaws to prevent movement of said jaws beyond said full work-engaging position, said member faces lying below and outwardly of said pivotal axes of said jaws, a recess in each of said member faces, spring means arranged within said recesses and arranged to resist movement of said jaw members from said initial work-engaging position to said full work-engaging position, and means for preventing movement of said spring means beyond the position corresponding to the initial work-engaging position of said jaws.

5. A vise for holding work on a work-supporting table of a machine tool, said vise comprising a pair of members movable inwardly toward and outwardly away from each other, a pair of jaws, each having a work-engaging face, said jaws being pivotally mounted on respectives ones of said members whereby each is freely pivotable inwardly and upwardly from an initial work-engaging position to a retracted position, the pivotal axes of said jaws being generally parallel to said work-supporting table and above said work-engaging faces of said jaws when said jaws are in said initial work-engaging position, each of said jaws also being pivotable outwardly from said initial work-engaging position to a full work-engaging position, a face on each of said members engageable by said jaws to prevent outward movement of said jaws beyond said full work-engaging position, said member faces lying below and outwardly of said pivotal axes of said jaws, a recess in each of said member faces, a coil spring arranged within each of said recesses, a plug arranged within each of said recesses, said springs urging said plugs inwardly toward each other and against the corresponding jaw whereby said springs urge said jaws away from said full work-engaging position toward each other, said plugs being locked in said recesses whereby said plugs may move inwardly under the influence of said springs only to positions corresponding to said initial work-engaging positions of said jaws.

6. A vise for holding work on a work-supporting table of a machine tool, said vise comprising a pair of members movable inwardly toward and outwardly away from each other, a pair of jaws, each having a work-engaging face and an oppositely directed member-engaging face, said jaws being pivotally mounted on respective ones of said members whereby each is freely pivotable inwardly and upwardly from an initial work-engaging position to a retracted position, the pivotal axes of said jaws being generally parallel to said work-supporting table and above said work-engaging and member-engaging faces of said jaws when said jaws are in said initial work-engaging position, each of said jaws also being pivotable outwardly from said initial work-engaging position to a full work-engaging position, a face on each of said members engageable by said member-engaging faces of said jaws to prevent outward movement of said jaws beyond said full work-engaging position, said member faces lying below and outwardly of said pivotal axes of said jaws, a recess in each of said member faces, a coil spring arranged within each of said recesses, a plug arranged within each of said recesses, said springs urging said plugs inwardly toward each other and against the member-engaging face of the corresponding jaw whereby said springs urge said jaws away from said full work-engaging position toward each other, said plugs being locked in said recesses whereby said plugs may move inwardly under the influence of said springs only to positions corresponding to said initial work-engaging positions of said jaws.

7. A vise for holding work on a work-supporting table of a machine tool, said vise comprising a pair of members movable inwardly toward and outwardly away from each other, a pair of jaws, each having a work-engaging face, a pair of hinges having leaves thereof secured to said jaws and said members whereby each jaw is freely pivotable inwardly and upwardly from an initial work-engaging position to a retracted position, the pivotal axes of said hinges being generally parallel to said work-supporting table and above said work-engaging faces of said jaws when said jaws are in said initial work-engaging position, each of said jaws also being pivotable outwardly from said initial work-engaging position to a full work-engaging position, each said jaw being prevented from outward movement beyond said full work-engaging position by abutment of said hinge leaves, the hinge leaf secured to said member extending downwardly and outwardly of said pivotal axis of said hinge, a recess in each of said members, each of said hinge leaves secured to said members having an opening overlying said recess, a coil spring arranged within each of said recesses, a plug arranged within each of said recesses, said springs urging said plugs inwardly toward each other and against the hinge leaf secured to the corresponding jaw whereby said springs urge said jaws away from said full work-engaging position toward each other, each said plug having a stud extending through said opening and a shoulder portion larger than said opening whereby said plugs may move inwardly under the influence of said springs only to positions corresponding to said initial work-engaging positions of said jaws.

References Cited in the file of this patent

UNITED STATES PATENTS

| | | |
|---|---|---|
| 168,064 | Thomas | Sept. 21, 1875 |
| 827,062 | Frain | July 24, 1906 |
| 1,372,027 | Jacobs | Mar. 22, 1921 |
| 2,124,200 | Lemieux | July 19, 1938 |
| 2,547,211 | Holmes | Apr. 3, 1951 |

FOREIGN PATENTS

| | | |
|---|---|---|
| 283,847 | Switzerland | Oct. 16, 1952 |